(12) United States Patent
Tibbe et al.

(10) Patent No.: US 11,730,311 B2
(45) Date of Patent: Aug. 22, 2023

(54) MIXING APPARATUS

(71) Applicant: KONINKLIJKE PHILIPS N.V, Eindhoven (NL)

(72) Inventors: Tim Gerard Tibbe, Eindhoven (NL); Joeke Noordhuis, Eindhoven (NL); Hendrik Klaas Louwsma, Eindhoven (NL); Gertrude Riëtte Bakker-Van Der Kamp, Eindhoven (NL); Andrea Pecci, Eindhoven (NL); Massimiliano Sceusa, Eindhoven (NL); Gerben De Roode, Eindhoven (NL); Jan Buffinga, Eindhoven (NL)

(73) Assignee: KONINKLIJKE PHILIPS N.V, Eindhoven (NL)

( * ) Notice: Subject to any disclaimer, the term of this patent is extended or adjusted under 35 U.S.C. 154(b) by 0 days.

(21) Appl. No.: 17/789,145

(22) PCT Filed: Dec. 24, 2020

(86) PCT No.: PCT/EP2020/087883
§ 371 (c)(1),
(2) Date: Jun. 24, 2022

(87) PCT Pub. No.: WO2021/130375
PCT Pub. Date: Jul. 1, 2021

(65) Prior Publication Data
US 2023/0024663 A1    Jan. 26, 2023

(30) Foreign Application Priority Data
Dec. 24, 2019  (EP) ..................... 19219590

(51) Int. Cl.
*A47J 31/44* (2006.01)
*B01F 25/312* (2022.01)
(Continued)

(52) U.S. Cl.
CPC ....... *A47J 31/4485* (2013.01); *A47J 31/4403* (2013.01); *A47J 31/46* (2013.01);
(Continued)

(58) Field of Classification Search
CPC .... A47J 31/4485; A47J 31/4403; A47J 31/46; A47J 31/3671; A47J 31/5253;
(Continued)

(56) References Cited

U.S. PATENT DOCUMENTS

| 4,960,042 A | 10/1990 | Grossi | |
| 2016/0015206 A1* | 1/2016 | Holten | B01F 23/2323 |
| | | | 261/79.1 |

FOREIGN PATENT DOCUMENTS

| WO | 2019/129599 | 7/2019 |
| WO | 2019/1029515 | 6/2021 |

OTHER PUBLICATIONS

Extended European Search Report issued in connection with corresponding EP Application No. 19219590.7 dated Jun. 25, 2020.
(Continued)

*Primary Examiner* — Phuong T Nguyen
(74) *Attorney, Agent, or Firm* — Maschoff Brennan (57) ABSTRACT

A mixing apparatus is described. The mixing apparatus has a first port for receiving milk, a second port for receiving steam, and a mixing chamber for mixing the milk, the steam, and air. A channel arrangement connects the first port and the second port, and defines an air intake channel which leads to a frothing section. The mixing apparatus is designed such that, in use, the frothing section fills sufficiently with steamed milk that has a direct path from the second port to the mixing chamber is interrupted by the steamed milk. This provides a noise reduction during use of the mixing apparatus. A flow reducing means, such as a barrier, may be used for this purpose.

14 Claims, 11 Drawing Sheets

(51) Int. Cl.
  *B01F 23/2326* (2022.01)
  *B01F 23/20* (2022.01)
  *B01F 23/235* (2022.01)
  *A47J 31/46* (2006.01)
  *B01F 101/07* (2022.01)

(52) U.S. Cl.
  CPC ........ *B01F 23/235* (2022.01); *B01F 23/2326* (2022.01); *B01F 23/291* (2022.01); *B01F 25/312* (2022.01); *B01F 2101/07* (2022.01); *B01F 2215/0472* (2013.01)

(58) Field of Classification Search
  CPC ...... A47J 31/3609; A47J 31/525; A47J 31/42; A47J 31/52; A47J 31/404; A47J 31/36; A47J 31/5255; A47J 31/34; A47J 31/545; A47J 31/24; A47J 31/30; A47J 31/5251; A47J 31/468; A47J 31/56
  USPC ......... 99/300, 290, 293, 295, 279, 280, 281, 99/282, 283, 284, 291
  See application file for complete search history.

(56) References Cited

OTHER PUBLICATIONS

International Search Report and Written Opinion issued in connection with corresponding PCT Application No. PCT/EP2020/087883 dated Mar. 23, 2021.

\* cited by examiner

MIXING APPARATUS

CROSS-REFERENCE TO RELATED APPLICATIONS

The present application is a U.S. National Phase application under 35 U.S.C. § 371 of International Application No. PCT/EP2020/087883, filed on Dec. 24, 2020, which claims the benefit of European Patent Application No. 19219590.7, filed on Dec. 24, 2019. These applications are hereby incorporated by reference herein.

FIELD OF THE INVENTION

This invention relates to the field of beverage preparation, and more specifically to the field of frothed milk beverage preparation.

BACKGROUND OF THE INVENTION

Typically, espresso appliances provide the function of automated cappuccino brewing. In most cases, steam is used for heating and frothing the milk, in a similar manner to a barista. To improve the ease of use of the appliance and provide stable performance to all users regardless of skill, several milk frothing modules have been developed. Normally, these modules are removable from the base appliance, to allow all parts in contact with milk to be cleaned regularly.

The applicant has developed a milk frothing module that comprises only two separable components, which makes it easily cleanable for the user. This milk frothing module is disclosed in WO 2019/129599 and WO 2019/1029515. In this milk frothing module, the frothing function is driven by a flow of steam (typically supplied by the espresso appliance).

One issue with a steam driven milk frothing module of this general type is the noise generated during use, which may be disturbing to a user.

US 2016/0015206 discloses a frothing device having a settling chamber for liquid froth to be formed. An obstacle is provided where frothing gas (air) is let in. This makes sure the frothing gas enters a predetermined position in a steam/liquid flow. In particular, the obstacle is located at a very small distance from the steam inlet.

U.S. Pat. No. 4,960,042 discloses another example of frothing device.

SUMMARY OF THE INVENTION

The invention is defined by the claims.

According to examples in accordance with an aspect of the invention, there is provided a mixing apparatus comprising:
a first port for receiving milk;
a second port for receiving steam;
a mixing chamber for mixing milk, steam and air; and
a channel arrangement between the first and second ports and the mixing chamber, wherein the channel arrangement comprises:
a first channel portion connected between the first port and a frothing section;
a second channel portion connected between the second port and the frothing section, wherein the frothing section couples to the mixing chamber; and
an air intake channel to the frothing section,
wherein the mixing apparatus is adapted such that, in use, the frothing section is filled sufficiently with steamed milk that a direct path from the second port to the mixing chamber is interrupted by the steamed milk.

The mixing apparatus has a channel arrangement, which brings together milk, steam and air to create heated and frothed milk. The frothing is created by the air introduced via the air intake channel. The apparatus is designed such that, in use, sufficiently filling of the frothing section with steamed milk is induced such as to prevent a direct path of steam from the second port to the mixing chamber.

The "steamed milk" (hereinafter also referred to as "milk mixture") includes a mixture of milk and steam. It may further include air.

In use, the steamed milk may fill up the frothing section "sufficiently", meaning: to such extent that a cross sectional area of the frothing section (at some point along the frothing section's length) is entirely filled with said steamed milk. The steamed milk thus forms a liquid barrier that physically blocks or interrupts any direct flow path of steam from the second port to the mixing chamber.

The invention is based on the recognition that a direct steam path is responsible for the generation of noise during use of the mixing apparatus. A direct steam path allows steam, especially high speed steam to escape from the milk mixture. This escaping of high speed steam causes noise. The arrangement of the invention thus provides a mixing device which generates a reduced amount of undesirable noise in use.

The mixing apparatus may comprise a flow reducing means downstream of the frothing section, for enabling the frothing section to fill sufficiently with steamed milk.

The flow reducing means is designed to increase the flow resistance and/or outflow resistance of the frothing section, so that during use sufficient milk mixture will collect in the frothing section to effectively block any direct steam path.

The direct path is interrupted "in use" because of the presence of milk in the frothing section which is caused by the intentional flow resistance of the flow reducing means. In particular, the milk collects in the frothing section at locations between the mixing chamber and the steam inlet (the second port). The flow reducing means achieves this by increasing the outflow resistance, causing more milk mixture to collect in the frothing section, effectively interrupting or blocking the direct steam path.

The flow reducing means may for example comprise a barrier element. The barrier element can provide a physical barrier to flow, to provide a back-resistance. The barrier element does not need to be of continuous configuration. In other words, the barrier element may have an interrupted configuration. In particular, due to the dynamic movement of the milk even a discontinuous barrier may be sufficient to provide the desired barrier function.

In one example, the barrier element may be arranged near or at an inlet to the mixing chamber. Thus, it may form part of the entrance to the mixing chamber from the channel arrangement or, in other words, it may be arranged at an interface between the frothing section and the mixing chamber. It may however optionally be further upstream (set back from the end of the frothing section, and hence nearer to the second port).

The mixing apparatus may have an outlet spout which receives the mixed liquid from the mixing chamber. In such case, the barrier element may be arranged near or at an outlet of the mixing chamber to the outlet spout. The barrier element may for example comprise a lip formed along an entry to the outlet spout. This is for example beneficial when the milk flows through the mixing chamber and/or outlet spout along a rotational flow path. The lip may be formed fully or partly around the entry to the outlet spout, to form a complete annulus or part of an annulus respectively.

The frothing section may comprises a diverging channel having a first channel height at the second port end, and a second, greater, channel height at the mixing chamber end, wherein the flow reducing means comprises a barrier element with a blocking dimension greater than the first channel height and less than the second channel height.

This arrangement ensures that the barrier causes filling of the diverging channel with milk mixture at least to the height of the diverging channel at the second port end. Thus, a direct path of steam from the second port is interrupted or blocked by the milk mixture. The blocking dimension of the barrier is sufficient that the frothing section is full at least at the second port end. Thus, at least a part of the frothing section is full in use, and this filled part provides the interruption of a direct steam path from the second port to the mixing chamber.

The barrier may comprise a notch. The notch may be located at a lowest point of the barrier (in normal use). The notch may function as a drain. The notch is not so large that the function of the barrier element is defeated but it enables emptying of the bath of milk mixture formed by the barrier at the end of use of the mixing apparatus, when the circulating flow has ceased. Thus, the barrier element does not need to be a continuous element.

The first channel portion may comprise a channel restriction. This restriction is used to control the correct temperature of operation. In particular, the barrier element changes the flow dynamics in the apparatus, which may for example result in an increased amount of steam condensing in the milk. This in turn may result in increased suction of milk at the first port. As this milk will typically be cold, more suction of milk may reduce the temperature of the frothed milk. The flow restriction in the first channel portion helps to slow the inflow of (cold) milk to result in a desired temperature range. The frothed milk temperature is for example in the range 62° C. to 71° C. The sound power level in use may for instance be below 75 dB.

The mixing apparatus may comprise:

a first container, wherein the first container comprises the channel arrangement;

a second container, wherein the second container is adapted to receive the first container; and a seal disposed between the first container and the second container.

This arrangement allows for milk and steam to be provided to the mixing chamber by way of a channel defined at least in part by a seal. In this way, the channel may be disassembled for cleaning by simply removing the first container from the second container as the channel arrangement only comprises these two separable parts.

In addition, as the channel is itself defined in part by the seal when disposed between the first and second containers, the adequate sealing of the channel is ensured. Mounting of the two containers together provides the required seal positioning and/or compression or extension.

The first container may further comprise a raised container portion, and wherein the channel arrangement is defined between the raised container portion and the seal.

In this way, the dimensions of the channel may be controlled by altering the depth of the raised container portion and the cleaning required for the seal is reduced. The seal for example comprises a span seal.

The invention also provides a coffee maker, the coffee maker comprising;

a liquid coffee extraction apparatus;

the mixing apparatus as defined above; and a dispenser adapted to dispense:

liquid coffee from the liquid coffee extraction apparatus; and frothed milk from the mixing apparatus.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a mixing apparatus having a first port for receiving milk, a second port for receiving steam and a mixing chamber for mixing milk, steam and air. A channel arrangement connects the ports as well as defines an air intake channel which leads to a frothing section. The mixing apparatus is designed such that, in use, the frothing section fills sufficiently with steamed milk that a direct path from the second port to the mixing chamber is interrupted by the steamed milk. This provides a noise reduction during use of the mixing apparatus. A flow reducing means, such as a barrier, may be used for this purpose.

Figure 1:
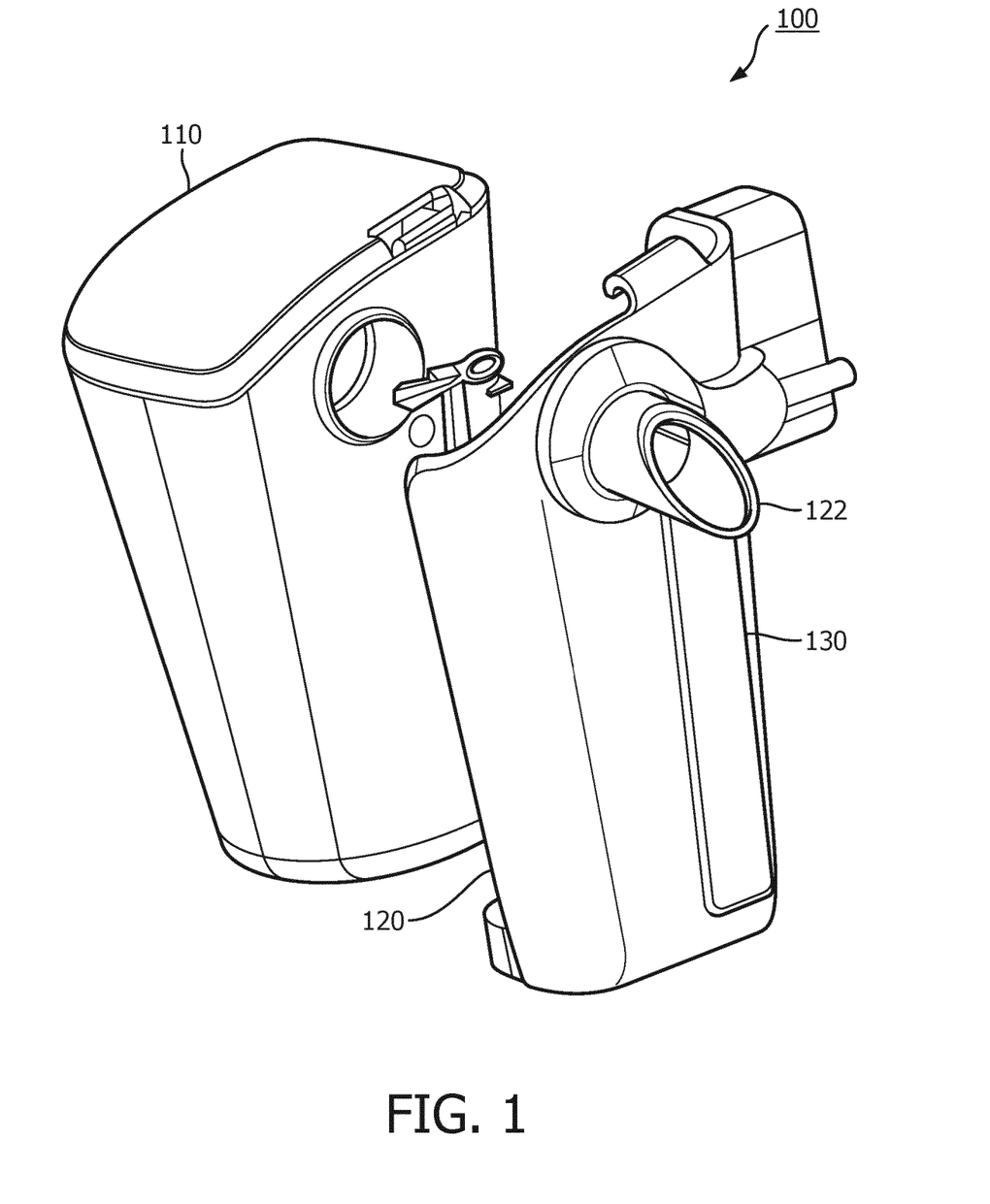
FIG. 1 shows a two-part mixing apparatus.

FIG. 1 shows the mixing apparatus 100 comprising a first container 110 and a second container 120, adapted to receive the first container 110. The second container may surround the first container, or it may only partially surround the first container, as shown. The second container 120 defines an outlet spout 122 from which frothed milk is provided. The first container may thus fit fully into the second container or else the second container may clip onto the outside of the first container.

A channel arrangement is formed by the interface between the first and second containers, as discussed in more detail below. A seal 130 provides sealing of the channel arrangement. When the first and second containers are separated, the channel arrangement is opened. In the illustrated embodiment, the seal 130 is visible on the outside of the second container 120 because it extends fully through the wall of the second container in this example. There is no purpose to the visible outer surface of the seal; rather it is just one aesthetic design option. The inner surface of the seal closes the channel portions of the channel arrangement.

Figure 2A:
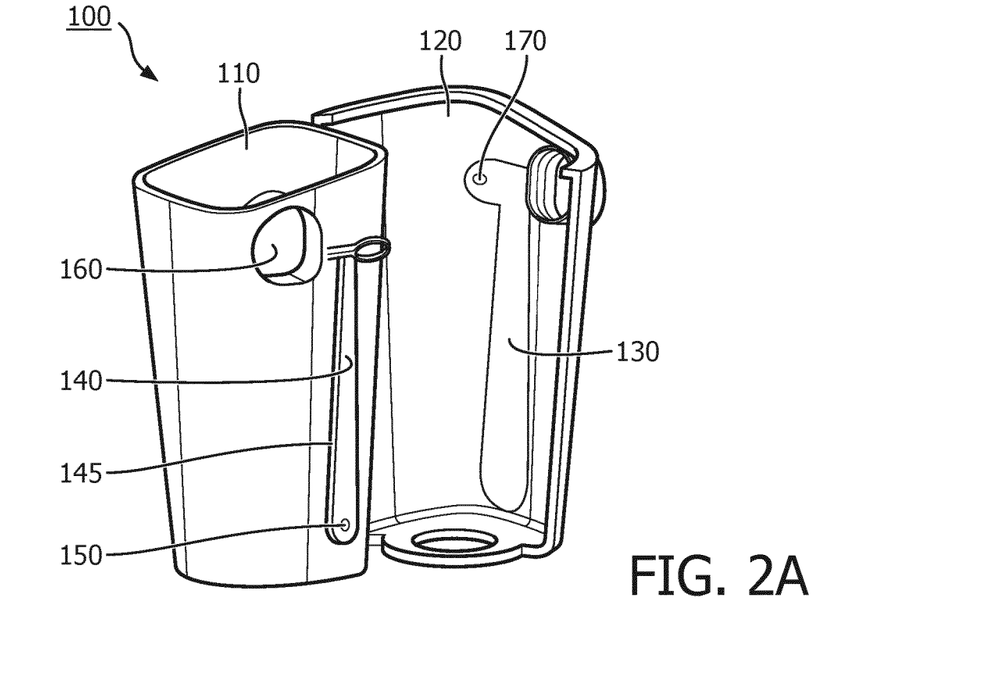
FIG. 2A shows an exploded view in more detail of the mixing apparatus of FIG. 1.

FIG. 2A shows the mixing apparatus 100 in more detail and shows the first container 110 the second container 120, adapted to receive the first container and the seal 130 disposed between the first and second containers.

Instead of being integrated with the container and extending fully through the container wall, the seal may be a press fit into a side wall of one of the two containers so that when the two containers are assembled, the seal is sandwiched between them. In all designs, the mating between the seal and the channel arrangement in one of the containers forms a closed channel which defines the fluid paths between a milk inlet, a steam inlet and a frothed milk outlet of the mixing apparatus 100. By separating the two containers all parts can be easily cleaned. Preferably, there is only one seal element for sealing the entire channel arrangement used for the supply and mixing of milk and steam.

The seal may be 2 shot (2K) molded into the second container 120, or else it may be a separate seal which is removable from a recess in the second container.

The channel arrangement 140 may be provided in the first container 110, and together with the seal 130 define a closed channel when the mixing apparatus is assembled. In the example shown in FIG. 2A, the first container 110 comprises a raised channel portion 145, which further defines the channel arrangement 140. The channel arrangement 140 connects a first port 150 near a bottom of the first container and a mixing chamber 160 near a top of the first container. The second container comprises a steam entry port (indicated with reference numeral 175 in FIG. 2B) connected to a second port 170 provided in the seal 130. The channel arrangement 140 further connects the second port 170 to the first port 150 and the mixing chamber.

Figure 2B:
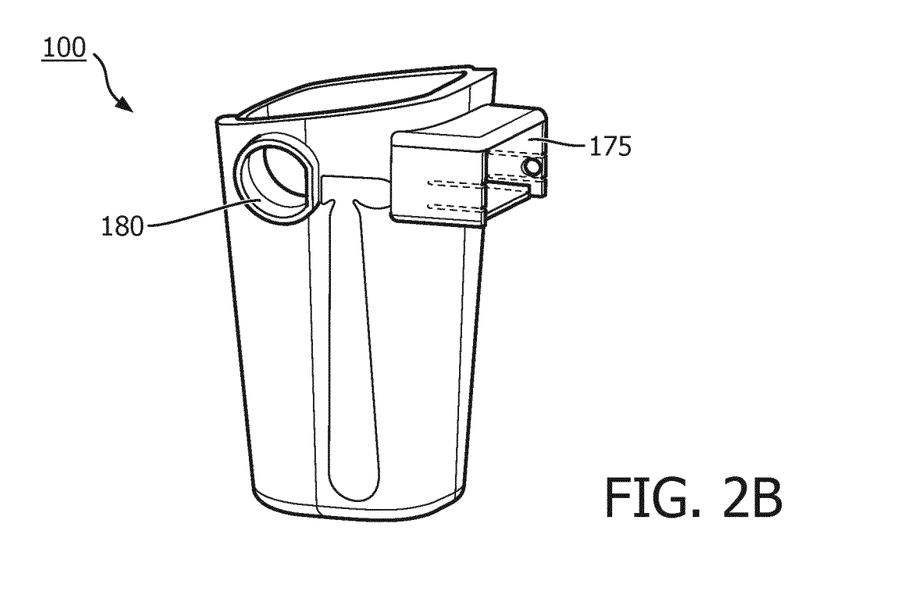
FIG. 2B shows an assembled view of the mixing apparatus of FIG. 2A.

FIG. 2B shows the mixing apparatus 100 of FIG. 1A in an assembled state.

In this Figure, it can be clearly seen that the second container 120 comprises a steam entry port 175 from which steam may be provided to the second port 170. The second container 120 further comprises a third port 180 that in assembled condition is connected to the mixing chamber 160 of the first container, thereby allowing the contents of the mixing chamber to be easily obtained from the mixing apparatus. The third port 180 leads to the outlet nozzle 122 (not shown in FIG. 2A or 2B but seen in FIG. 1). The operation of the mixing apparatus is described with reference to FIG. 3A below.

Figure 3A:
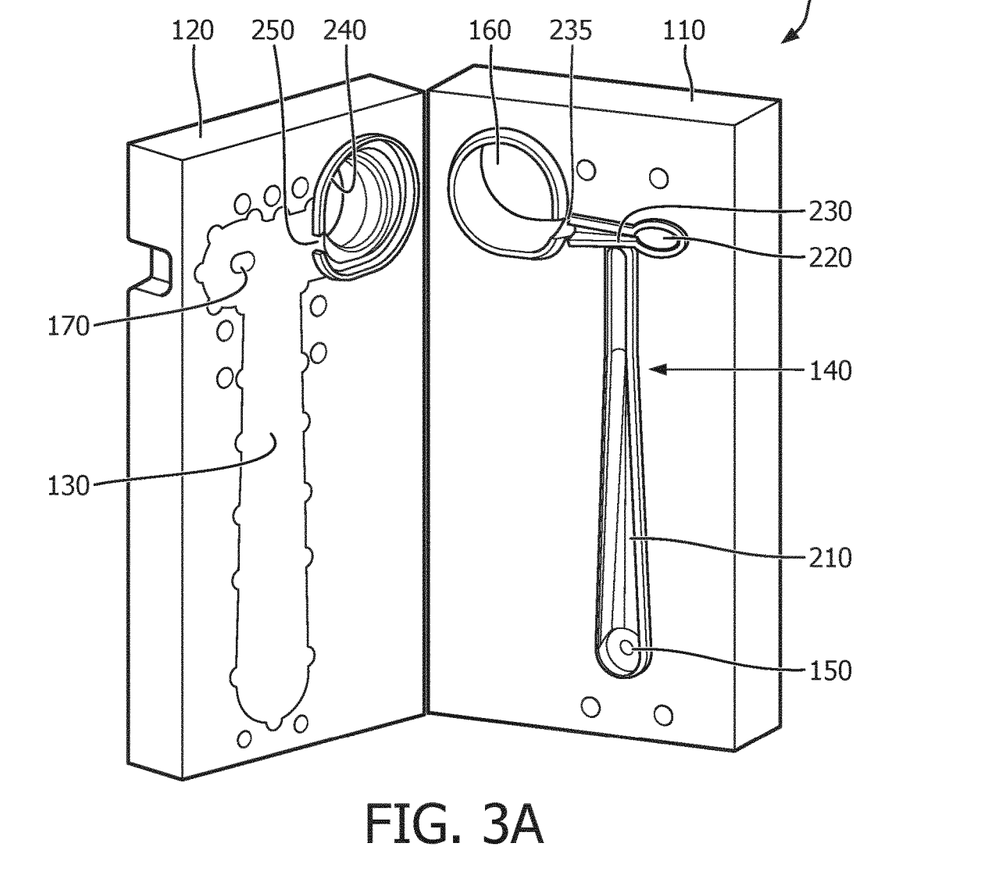
FIG. 3A shows a detailed view of the channel of the mixing apparatus of FIG. 2A.
Figure 3B:
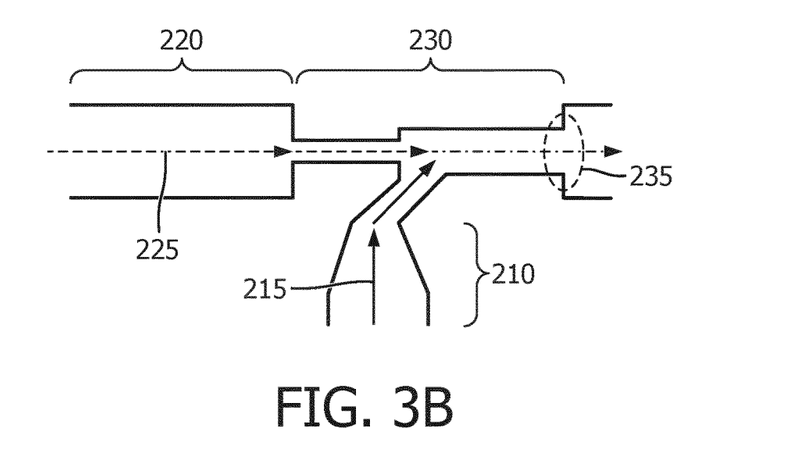
FIG. 3B shows the flow of fluid through the channel of FIG. 3A.

FIG. 3A shows a detailed view 200 of the channel arrangement 140 of the mixing apparatus of FIG. 2A. FIG. 3B shows a simple illustration of the intersection of the various portions of the channel arrangement 140.

The channel arrangement 140 may be divided into several portions according to the operation performed by each portion. In operation, milk may be provided to the first container 110 and steam may be provided to the steam entry port 175 of the second container. As steam enters the channel arrangement 140 by way of the second port 170, milk 215 is drawn from the first container 110 into a first channel portion 210 by way of the first port 150. The steam 225 enters a second channel portion 220 and travels through a third channel portion 230 (hereinafter also referred to as frothing section) and into the mixing chamber 160. The flow of steam generates a reduced pressure (compared to the ambient pressure) in the third channel portion 230, thereby drawing in the milk 215 along the first channel portion 210. The steam is further used to heat the milk and mix the milk with air to create milk froth and thus forms the driving force of the overall frothing system.

The milk 215 is drawn along the first channel portion 210 until it meets the flow of steam 225 at the intersection of channel portions 210 and 230. This intersection may be at a central part of the third channel portion 230, just downstream of a throat formed between the second channel portion 220 and the third channel portion 230. At this throat, the steam is accelerated substantially, thereby imparting a Venturi effect (a reduction in fluid pressure that results from the constriction of the throat) on the steam as it passes into the third channel portion 230.

The static absolute steam pressure (which in the given example may for instance be approximately 1.9 bar=190 kPa) is thereby transferred into a dynamic pressure (velocity). The milk is sucked in by the resulting pressure reduction. The steam velocity is highest at the end of the throat, i.e. where the first channel portion 210 intersects the third channel portion 230. The second part of the third channel portion 230, i.e. the portion downstream of the throat and aforementioned intersection may be considered to function as a diffuser, in which the velocity of the milk and steam mixture slows down, transferring dynamic pressure back into static pressure.

The third channel portion 230 terminates at an end 235 which opens into the mixing chamber 160. An air intake channel 725 is formed at the end 235, just upstream of the mixing chamber, via which air is introduced in the milk/steam mixture. The flow speed of the milk/steam mixture near the air intake channel is such that the static pressure is still below ambient pressure, so that air is drawn in and leakage of milk/steam mixture is prevented. The introduced air provides bubbles for the desired frothing.

In the mixing chamber 160, the mixture of milk, steam and air reaches ambient static pressure and the velocity component or dynamic pressure returns to zero.

Thus, the steam experiences a Venturi effect in the throat. This is the master (active) effect, driving the milk flow as a slave (passive) effect. This Venturi effect in the third channel portion 230 may be achieved by simply restricting the cross sectional area of the third channel portion 230 relative to the second channel portion 220. The flow of the milk and steam in the third channel portion, in combination with the drawing in of air, defines the frothing performance of the mixing apparatus, and the pressure differentials prevent the milk and steam from flowing down the incorrect channels. The third channel portion may thus be considered to be a frothing section.

The first channel portion 210 may typically be vertical in use and extend up from the (milk entry) first port 150. At the top, it may meet the second channel portion 220 to one side which has the steam entry port 175 at its remote end, and the third channel portion 230 to the other side, which has the mixing chamber 160 at its remote end. In the illustrated embodiment, the channel arrangement 140 thus has a T-shape, and the seal 130 has a corresponding T-shape.

The seal 130 may be an integral part of the second container. It may alternatively be a removable seal, in which case it may be a press fit into a side wall of the second container 120. In some instances, the seal 130 may comprise a first sealing member 240 comprising a transition portion 250. These will be described in more detail with reference to FIG. 6.

As explained above, air is drawn in via the air intake channel 725 at the end 235 of the third channel portion 230 so that there is a milk, steam and air mixture entering the mixing chamber 160. The aim of the mixing chamber is to release large bubbles and retain only small air bubbles in the mixture. The air, milk and steam mixture forms the fluid that enters the mixing chamber.

Figure 4A:
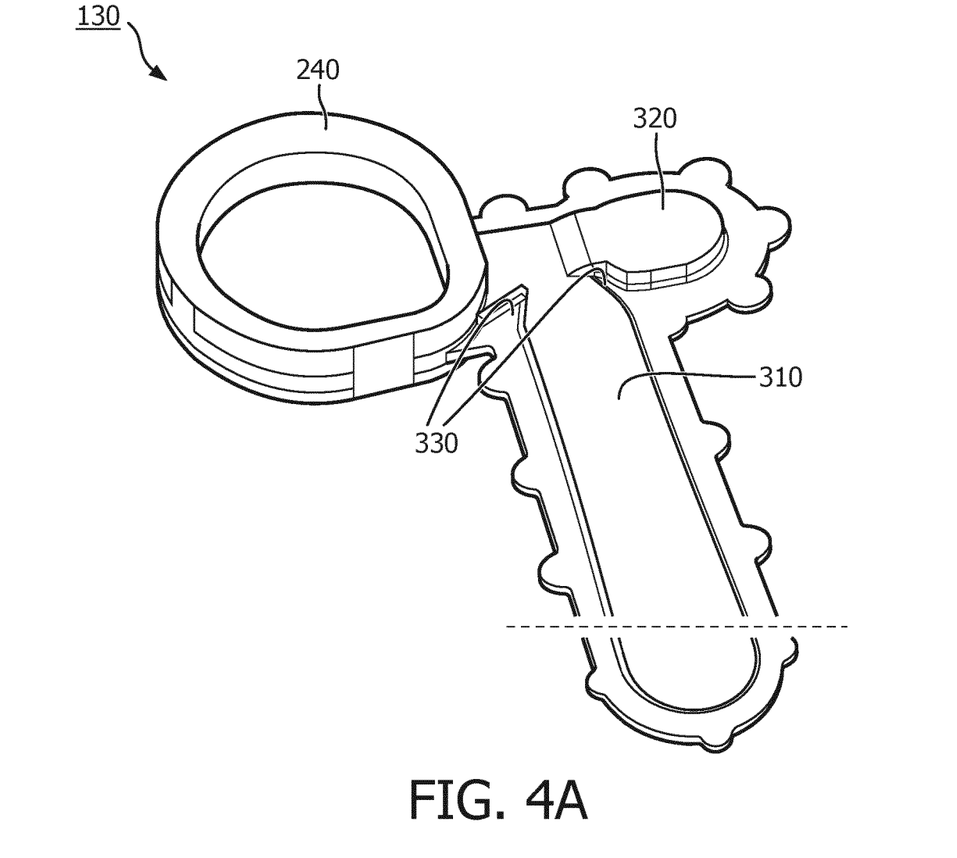
FIG. 4A shows an example of a span seal.

FIG. 4A shows the seal 130 of FIG. 3A in more detail.

It is clear from the description above that the various channel portions 210, 220, 230 may undergo a variety of different conditions when the mixing apparatus 100 is in operation. Therefore, the respective seal areas of these channel portions may each have their own seal requirements or specifications. The seal areas may be integrated in a single seal, for instance a span seal, as illustrated. The specifications of the respective seal areas can easily be optimized, e.g. by locally varying the thickness of the seal. By integrating the different seal areas in a single seal, there is no risk of leakage at the transition between the various areas.

There are three parameters that may be adjusted to tune the sealing force of the span seal. The three parameters are: the shore hardness of the seal; the span width of the seal, which increases the sealing force but may also introduce some deformation to the channel; and the thickness of the seal. As the various areas of the span seal may be tuned using the span width and seal thickness, the risk of leakage is largely reduced as the need for transitions between different seals is eliminated.

For example, the seal may comprise a first sealing portion 310 for sealing the first channel portion 210 of the channel. Thus, the first sealing portion should be adapted to withstand the reduced pressure present in the first channel portion. As this pressure is typically low, for example, around 0.15 bar (15 kPa) below ambient pressure, the required sealing force is low; however, the first channel portion may be relatively long, for example 200 mm, meaning that the required sealing force increases. As the milk is low temperature at this stage and the dimensions of the first channel portion are not critical to the milk frothing process, the sealing force of the first sealing portion may be increased by simply increasing the span width.

As a further example, the seal may comprise a second sealing portion 320 for sealing the second channel portion 220 of the channel. In this case, the second sealing portion must withstand both the high pressure, for example 1 bar (100 kPa), and the high temperature, for example 105°, of the steam entering the channel. As with the first channel portion, the geometry of the second channel portion is not critical to the milk frothing process meaning that the span width of the second sealing portion may be increased to increase the sealing force and the seal thickness may be increased to increase both the sealing force of the second sealing portion and the resistance of the second sealing portion to the high temperature of the steam.

As a final example, the seal may comprise a third sealing portion 330 for sealing the third channel portion 230 of the channel. The dimensions of the third channel portion are critical to the performance of the milk frothing process and the tolerance for deformation is low, for example ±0.1 mm. Therefore, the span width of the third sealing portion may not be freely increased and seal thickness delivers only marginal benefit to the sealing force itself. In this case, the shore hardness of the seal provides the required sealing force. The shore hardness of the seal may be constant, for example 45 shore, throughout the seal in order to prevent excessive span widths and seal thicknesses in the first and second sealing portions. In addition to the milk frothing process, the seal would be required to withstand daily cleaning, typically by way of a dishwasher. In this case, the shore hardness of the seal may help to extend the lifetime of the seal.

Finally, the seal has the first sealing member 240 which provides a radial seal around the mixing chamber. The three sealing portions are span seals whereas the first sealing member 240 is a radial seal. A span seal cannot be used to seal the mixing chamber because an opening is needed for the frothed milk to exit the apparatus. The three sealing portions and the first sealing member preferably together form a single integrated component.

Figure 4B:
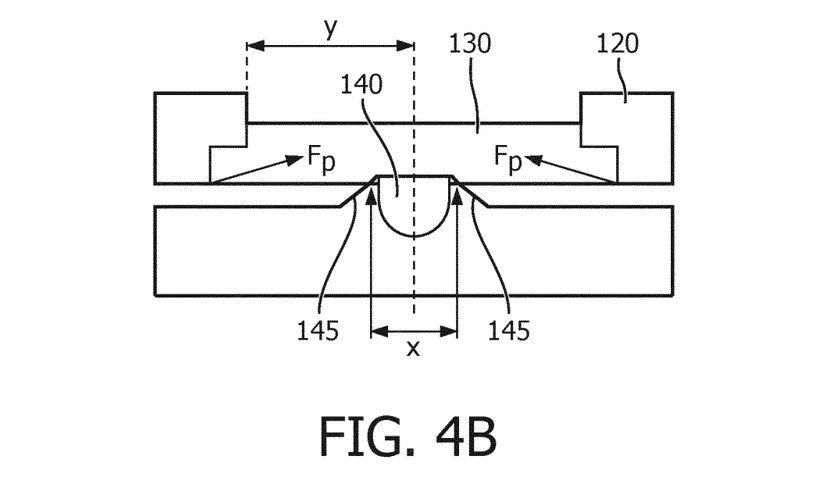
FIG. 4B illustrates the operation of the span seal of FIG. 4A.

FIG. 4B illustrates the operation of one of the span seal portions of seal 130.

The span seal works on pull forces, FP, which stretch the seal over the channel arrangement instead of compressing it. The span seal provides sealing directly onto the channel arrangement, more particular the raised portions 145, without a large amount of deformation of the seal being needed. The channel arrangement 140 cross sectional dimension and shape is independent of the indentation and sealing force, leading to a more stable milk froth performance, particularly in the third sealing portion 330.

Figures 5A, 5B:
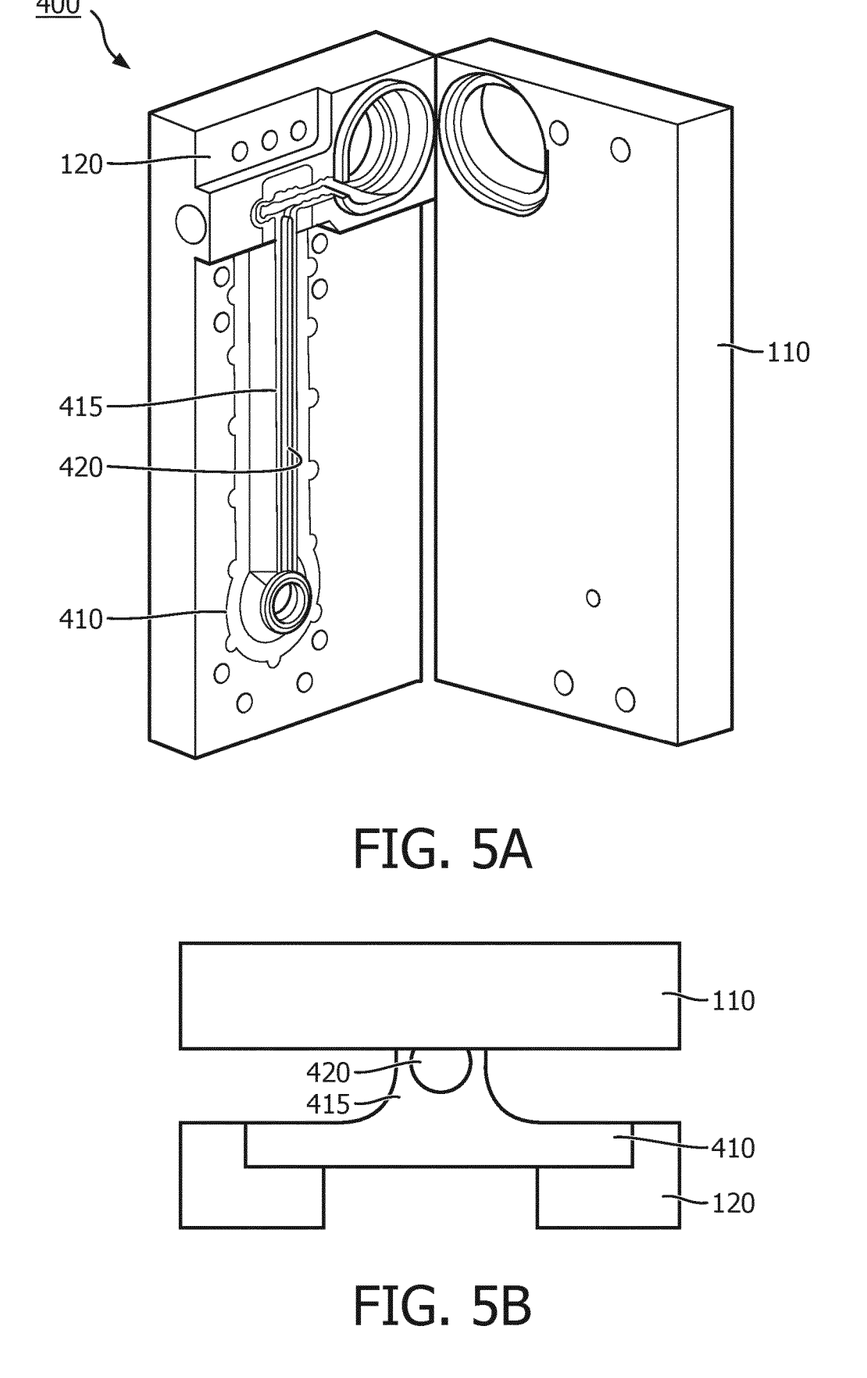
FIG. 5A shows an alternative channel of a mixing apparatus.
FIG. 5B shows a cross section of the channel of FIG. 5A.

FIGS. 5A and 5B show a detailed view of an alternative channel arrangement 400.

In this case, the seal 410 comprises a raised seal portion 415, which defines the channel 420 in combination with the first container 110. This arrangement simplifies the cleaning of the first container as there are fewer raised portions in which the ingredients may get stuck. In this case, the shore hardness of the seal may need to be further increased in order to ensure that the raised seal portion does not deform under high pressure, thereby causing leakage to occur.

Figure 6:
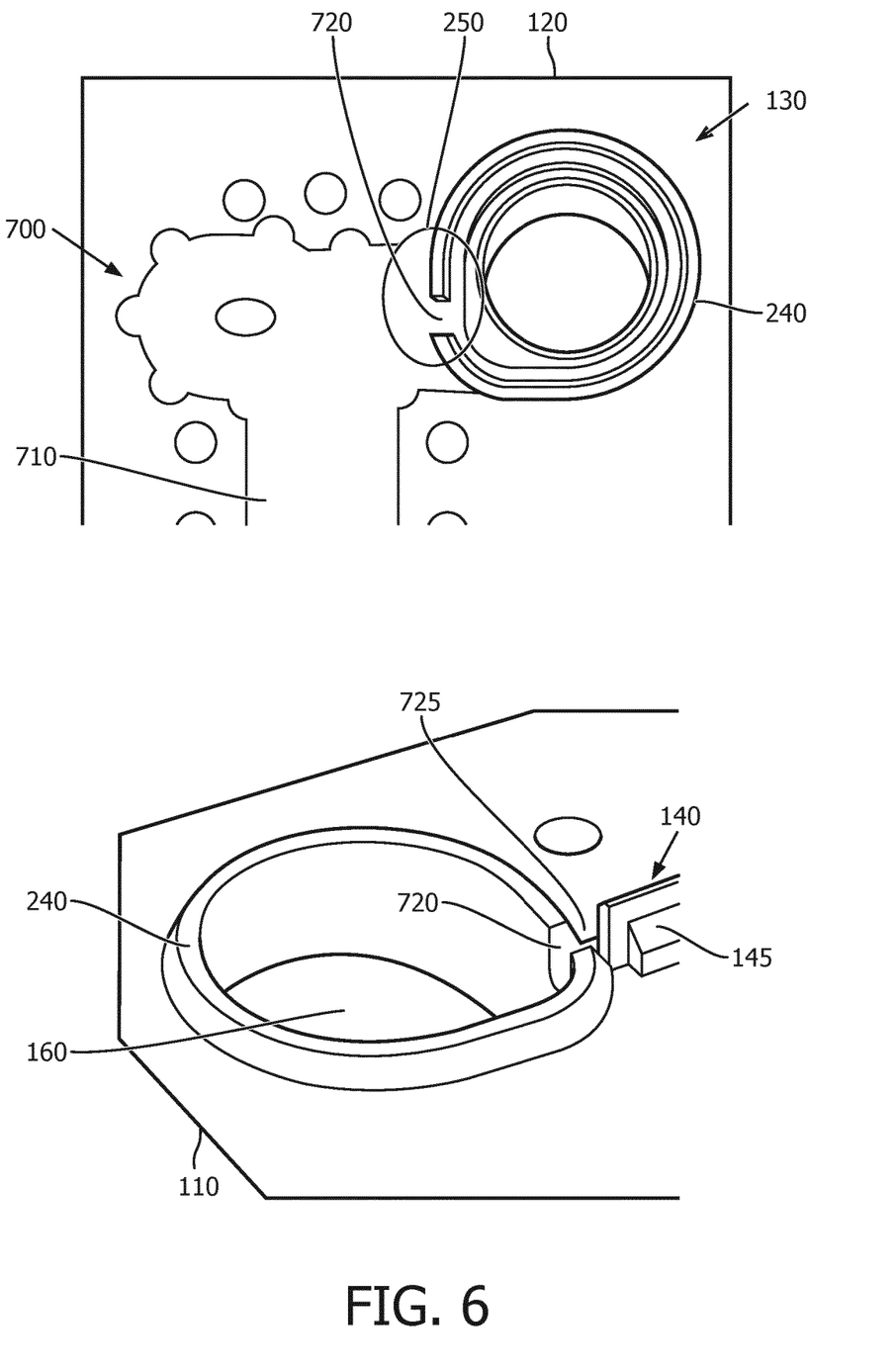
FIG. 6 shows an example transition portion of a seal.

FIG. 6 shows a seal 700 having a first sealing member 240, which in this case is a radial seal, and a sealing portion 710, which may correspond to the set of span seals 310, 320, 330 described above in relation to FIG. 4A. FIG. 6 in particularly shows a transition portion 250 between the first sealing member 240 and sealing portion 710, as previously illustrated in FIG. 4A. A view from above is shown in the top image and a perspective view of the opposite container is shown in the bottom image.

In the transition portion 250, the first sealing member 240 comprises a seal split 720 to allow movement of milk and steam from the channel defined by sealing portion 710 into the mixing chamber 160. In this way, it is possible to integrate both the span seal 710 and the radial seal 240 into a single seal, thereby increasing the simplicity of the mixing apparatus for disassembly and cleaning. However, the transition portion 250 between both seal types is known to be prone to leakage, which may be aggravated by the presence of seal split 720. In the illustrated embodiment, this potential disadvantage is turned into an advantage by locating the air intake at said transition portion.

As seen more clearly in the bottom image, the channel 140 in this example is defined by raised portions 145 of the first container 110. These raised portions define the sides of the flow channels where span seal 710 is to be applied. A gap 725 is formed in one of the raised portions that runs up to the mixing chamber, just upstream of the mixing chamber, adjacent the seal split 720. The gap 725 opens into the space between the first and second containers and allows external communication to the end 235 of the third channel portion 230 (as shown in FIG. 3A). The gap 725 thus forms an air intake channel via which outside air may enter the end 235 of the third channel portion 230.

The speed of the liquid (milk, steam and air) entering the mixing chamber 160 is important for the foam quality. The distance between the milk Venturi and the air gap 725, and the distance between the air gap and the mixing chamber are parameters for defining the milk frothing characteristics.

To the extent described above, the mixing apparatus is known, and indeed FIGS. 2 to 6 are taken from WO 2019/129599 and WO 2019/1029515.

This invention relates to controlling the noise generated during operation of the mixing apparatus. The invention is described as a modification to the design of FIGS. 1 to 6, but the underlying concept may be applied to other designs of mixing apparatus. The invention relates in particular to control of the flow of steam to the mixing chamber.

Figure 7:
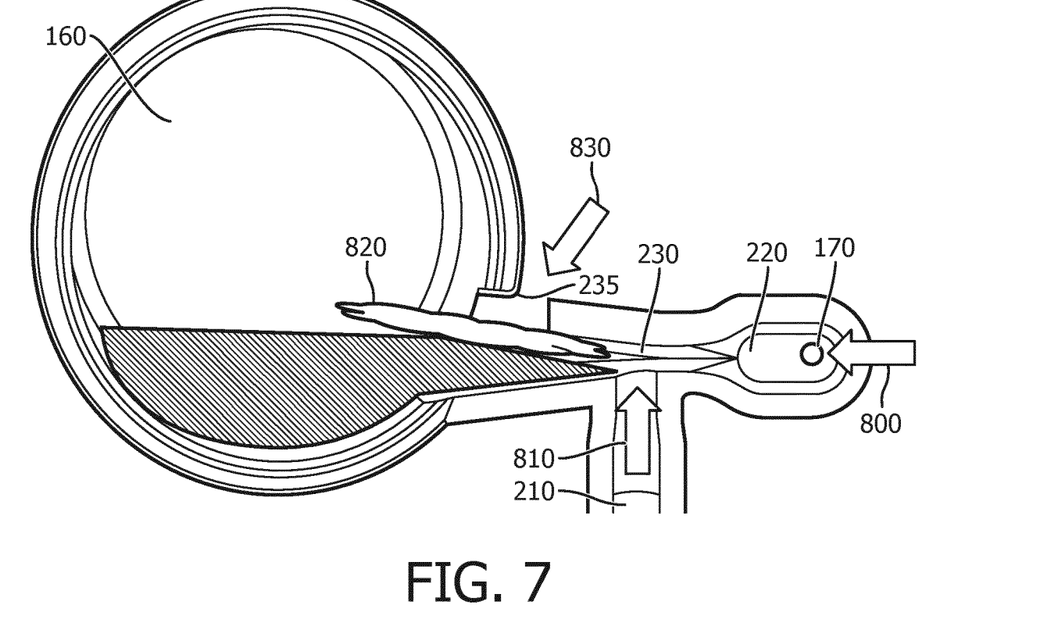
FIG. 7 shows the flows taking place in the known apparatus and is used to explain the source of noise.

FIG. 7 is used to show the cause of noise during the operation of the mixing device. The steam flow 800 enters the second channel portion 220 under pressure, as a steam jet. Some of the steam mixes with the milk flow 810 to provide heating but some also passes over the milk directly into the mixing chamber as shown by the cloud 820. This escaping steam is the cause of a hissing noise. The air intake is shown by arrow 830.

The cause of the problem is that in the third channel portion 230, the steam may not be fully condensed into the liquid (milk or milk/steam mixture) and therefore may escape from the liquid layer. The opening formed by the escaping steam creates an open path to the noise source. In order to make the mixing device more silent, the steam flow or jet must be prevented from escaping. Ideally, the steam must be condensed into the milk before exiting the third channel portion 230. This condensation is triggered by generating a counter pressure and by keeping the third channel portion 230 filled.

Figure 8:
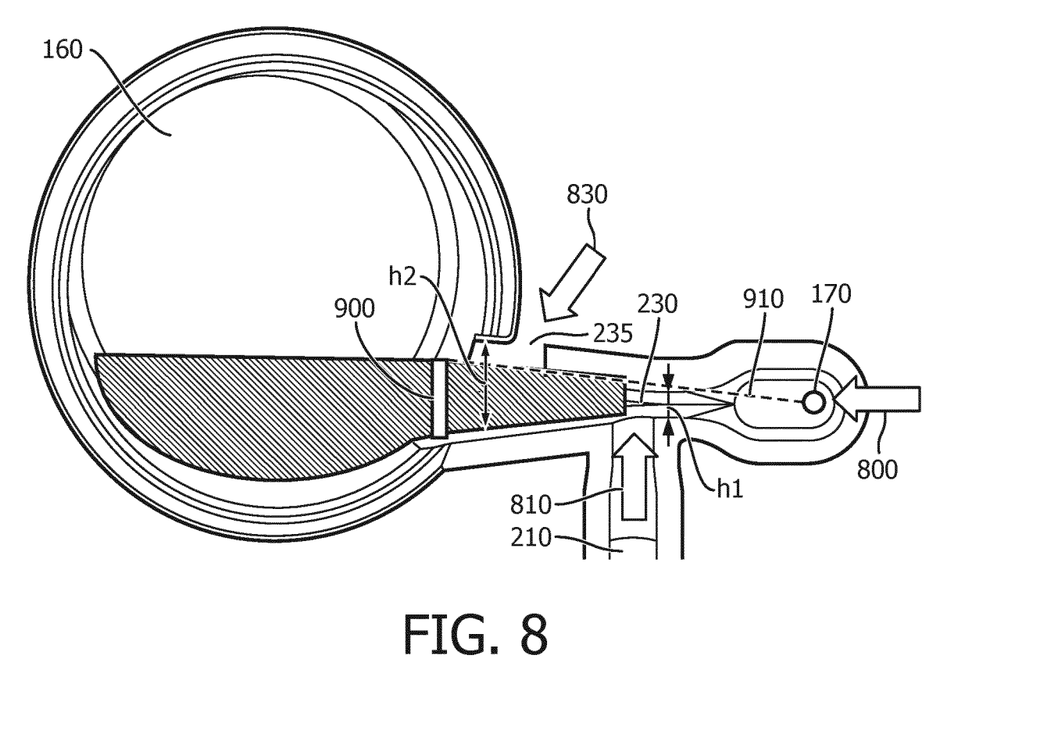
FIG. 8 shows a flow arrangement in schematic form.

FIG. 8 shows in schematic form an arrangement to address this problem.

A flow reducing means, which in this example comprises a barrier element 900, is provided downstream of the frothing section 230, near its interface with the mixing chamber. The barrier 900 creates a counter pressure. The resulting flow resistance causes the frothing section 230 to be filled with steamed milk, as seen in FIG. 8. In this configuration, a direct path from the second port 170 to the mixing chamber 160 is interrupted by the steamed milk. This direct path is shown as line 910. As this direct path is responsible for the generation of noise during use of the mixing apparatus, the arrangement according to FIG. 8 thus generates a reduced amount of undesirable noise in use.

In the illustrated embodiment, the third channel portion 230 comprises a diverging channel (to create a Venturi effect to draw in the milk) having a first channel height h1 near the second port end, and a second, greater, channel height h2 at the mixing chamber end.

The barrier element 900 has a blocking dimension greater than the first channel height and less than the second channel height. In the image shown, this blocking dimension may be considered to be the height of the barrier. However, in some examples, the barrier is not a simple rectangular structure so the blocking dimension is not then a simple vertical height.

This arrangement ensures that the barrier causes filling of the third channel portion 230 at least to the height of the diverging channel at the second port end. This means there is a physical barrier formed by the milk/steam mixture which interrupts the direct path of steam from the second port 170 to the mixing chamber 160. Only one part along the length of the third channel portion 230 needs to be "full" to ensure that the steam path is interrupted.

FIG. 8 schematically shows the barrier element 900 arranged at an inlet to the mixing chamber 160 from the third channel portion 230. Thus, it may form part of the entrance to the mixing chamber from the channel arrangement 140.

Figure 9A:
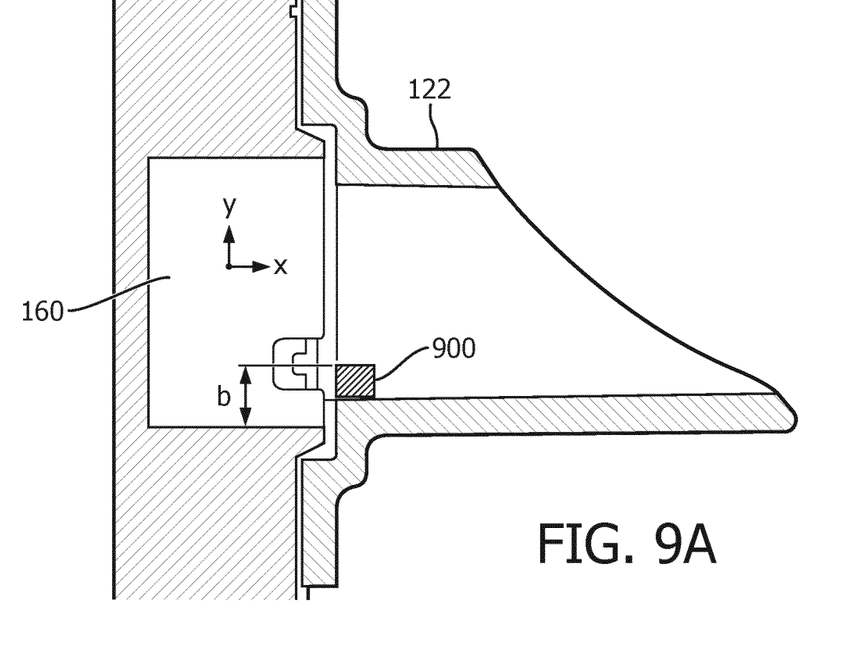
FIGS. 9A and 9B shows two examples of mixing apparatus design in accordance with the invention.
Figure 9B:
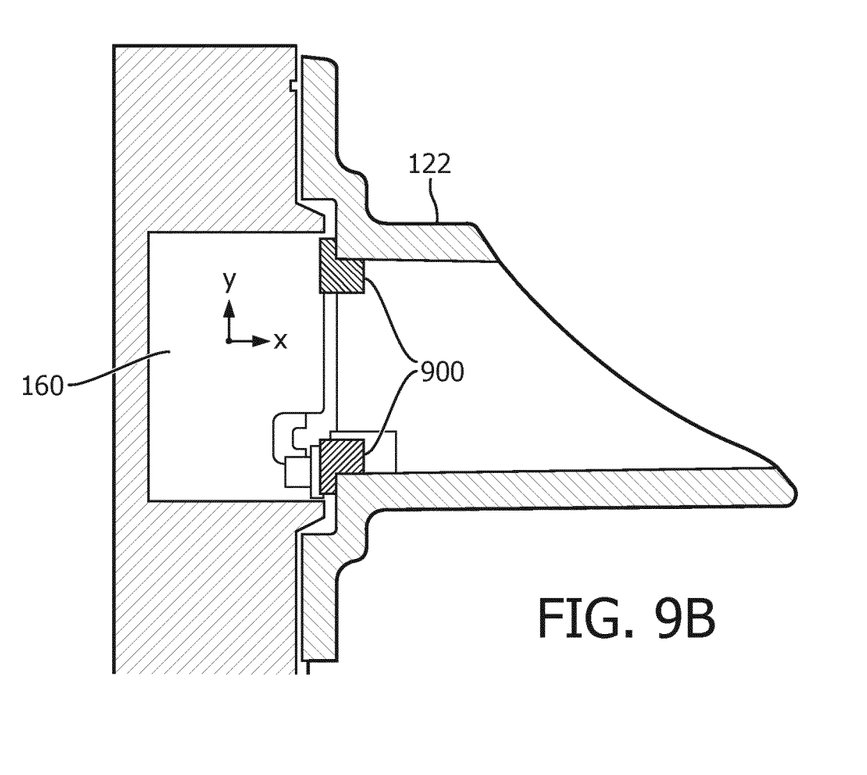

FIGS. 9A and 9B show two versions of a second example in which the barrier element 900 is formed at an outlet of the mixing chamber 160 to the outlet spout 122. A barrier blocking dimension b (relative to the bottom of the mixing chamber 160) is shown which is sufficient to prevent a direct path of steam to the mixing chamber, because in use the mixing chamber fills with milk mixture due to the flow resistance caused by the barrier element, before (frothed) milk then flows out to the outlet spout 122.

FIG. 9A shows a barrier element in the form of a dam, at the base of the outlet spout. The blocking dimension may then be considered to be a vertical dam height.

However, the milk flow from the mixing chamber to the spout may have a dynamic flow pattern. The barrier element may therefore extend around the opening to the outlet spout 122 as shown in FIG. 9B. The passage of liquid from the mixing chamber to the outlet spout may take place at any angular location around the barrier element. The blocking dimension of the barrier may then be considered to be a radial inward dimension of the barrier rather than a vertical height of the barrier.

Figure 10:
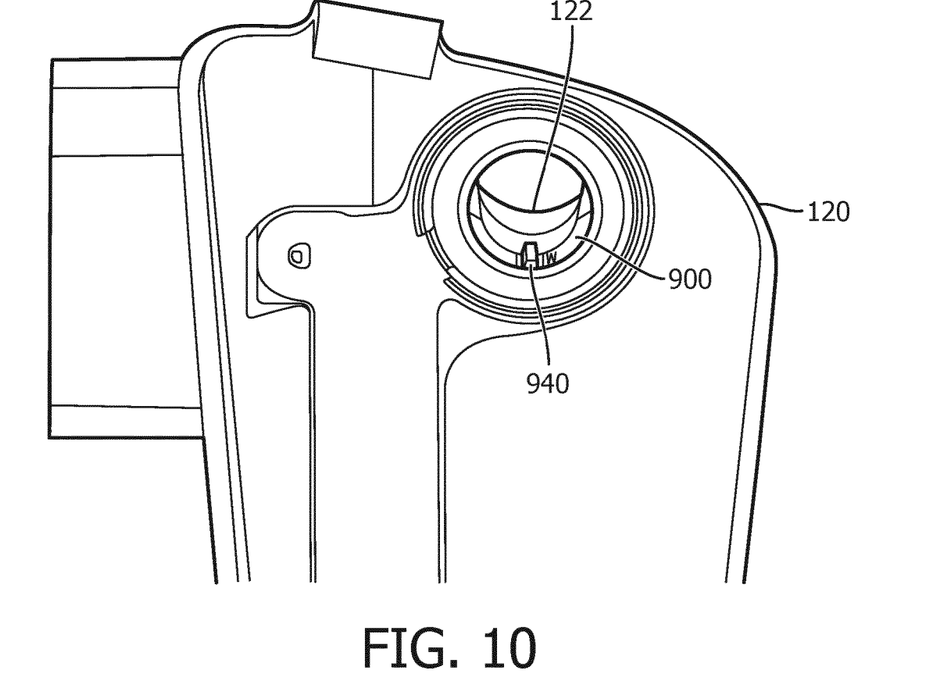
FIG. 10 shows another example of mixing apparatus design in accordance with the invention.

FIG. 10 shows a design of the barrier element 900 in the form of a partial annulus. FIG. 10 is a view looking out from the inside of the second container 120 through the outlet spout 122.

The barrier element forms an arc around at least the bottom section of the interface between the mixing chamber and the outlet spout. It extends around at least 90 degrees, for example approximately 180 degrees. It may instead extend fully around the interface (shown in FIG. 13), and this may be a more aesthetically pleasing design (i.e. if the barrier element is visible from the outlet spout).

The arc thus has the form of a lip around the entry to the outlet spout. In this way, the barrier forms an annulus or partial annulus.

As mentioned above, the benefit of an arcuate barrier rather than a straight dam type barrier is that the flow of milk may be circulating, spirally outwards towards the outlet spout. Thus, an annular barrier element performs a barrier function in radial direction of the mixing chamber (or outlet spout), instead of in a vertical direction above a lowest point of the mixing chamber (or outlet spout).

FIG. 10 also shows that the barrier element 900 may have a notch 940 at its base.

The notch 940 functions as a drain so that at the end of the frothing function, once the circulating flow has ceased, the mixing chamber is able to drain fully to the outlet spout 122.

Figure 11:
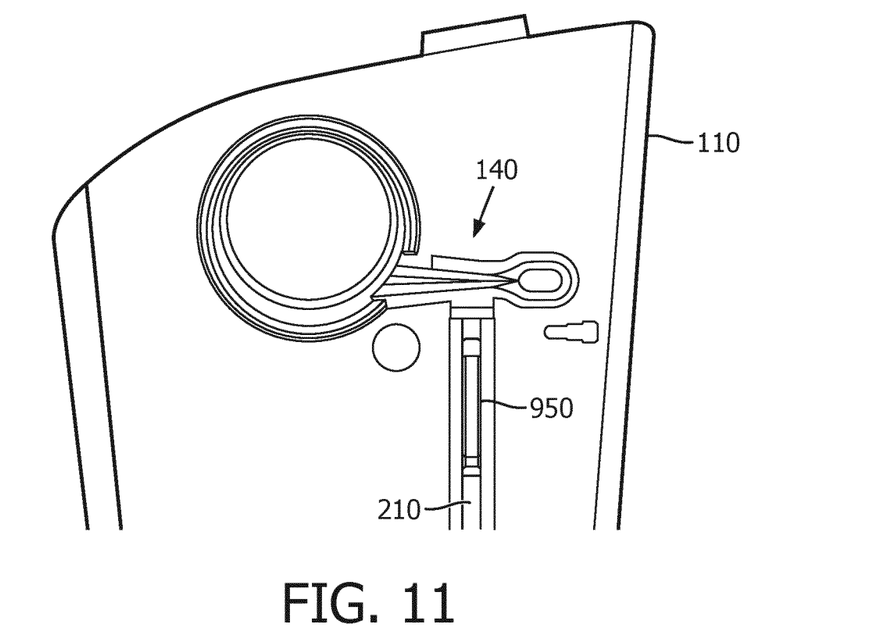
FIG. 11 shows another view of the design of FIG. 10.

FIG. 11 shows the first container 110 for the same overall mixing apparatus design as FIG. 10. There is no change to the first container, and to the channel arrangement 140, for this implementation of the barrier element.

One consequence of the use of the barrier element 900 is that if all steam condenses into the system, more suction is created (in the frothing section 230, downstream of the Venturi throat). More suction means more cold milk is drawn in, which results in a lower temperature of the milk froth.

To compensate for this temperature reduction effect, a milk flow restriction may be provided in the milk channel, i.e. the first channel portion 210. FIG. 11 shows the restriction 950. The restriction 950 may be an insert which partially blocks the first channel portion 210 so that it has a reduced cross sectional area.

As will be explained below with reference to FIG. 14, the restriction 950 may be finely tuned to achieve a desired froth temperature at the one hand and a desired noise behavior at the other hand. A mild restriction 950 may result in less noise and a more stable, silent behavior because it allows more milk to be drawn in: more cold milk allows more steam to condensate in the milk which helps to dampen the noise. However, it also reduces the temperature of the frothed milk. A more severe restriction 950 will draw in less milk, and will thus help to keep the frothed milk at a higher temperature, but may result in more noisy behavior.

Of course, the first channel portion 210 may be designed with the appropriate dimensions rather than having a separate insert. The use of a separate insertable restriction may be beneficial when the barrier element 900 is a modification to the second container 120, and the restriction 950 then provides an easy-to-implement modification that can be easily retrofitted into an existing first container 110.

Figure 12:
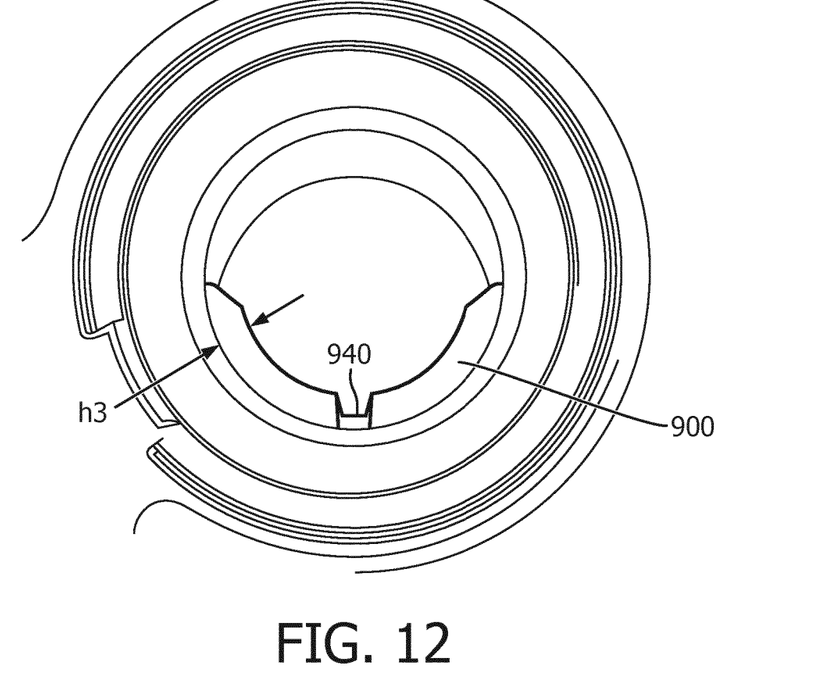
FIG. 12 shows an enlarged view of part of FIG. 10.

FIG. 12 shows the example of a barrier element 900 of FIG. 10 in more detail. It has a radial blocking dimension h3 and extends around approximately 180 degrees in this example. The notch 940 is also shown more clearly. The barrier element is integrated into the outlet spout 122. By increasing the blocking dimension h3, the counter pressure increases and the noise dampening is improved. A too large blocking dimension can however lead to large milk foam bubbles from the outlet spout 122 when frothing milk. Thus, there is an optimal barrier blocking dimension.

The notch 940 also reduces the risk of bubbles being delivered from the outlet spout. A wider notch will reduce the counter pressure, but this can be compensated by increasing the barrier blocking dimension h3. Thus, a compromise between the barrier blocking dimension and the design of the notch can be found.

Figure 13:
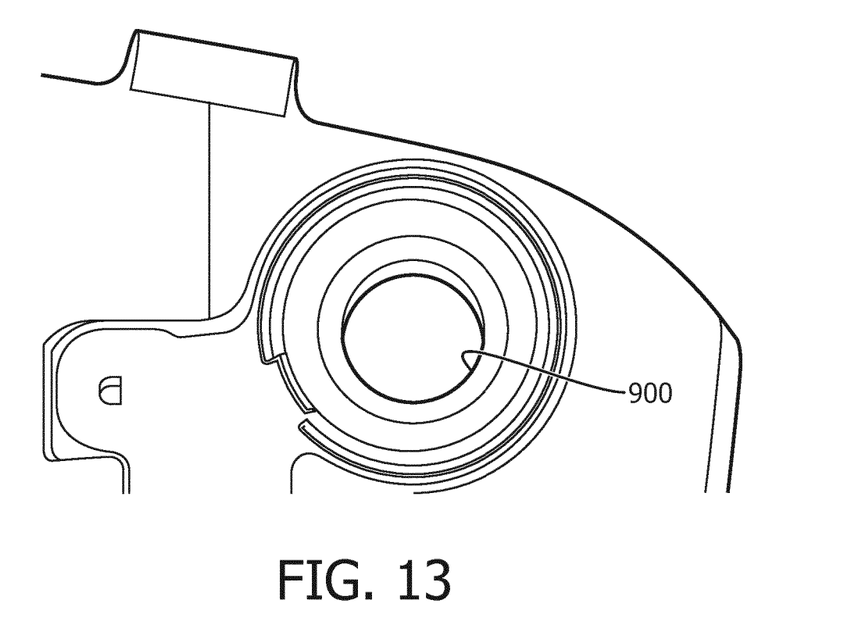
FIG. 13 shows an enlarged view of an alternative design.

FIG. 13 shows the same view as FIG. 12 for a barrier element which is formed as a full annulus around the entrance to the outlet spout 122. In this example, no notch is present.

Figure 14:
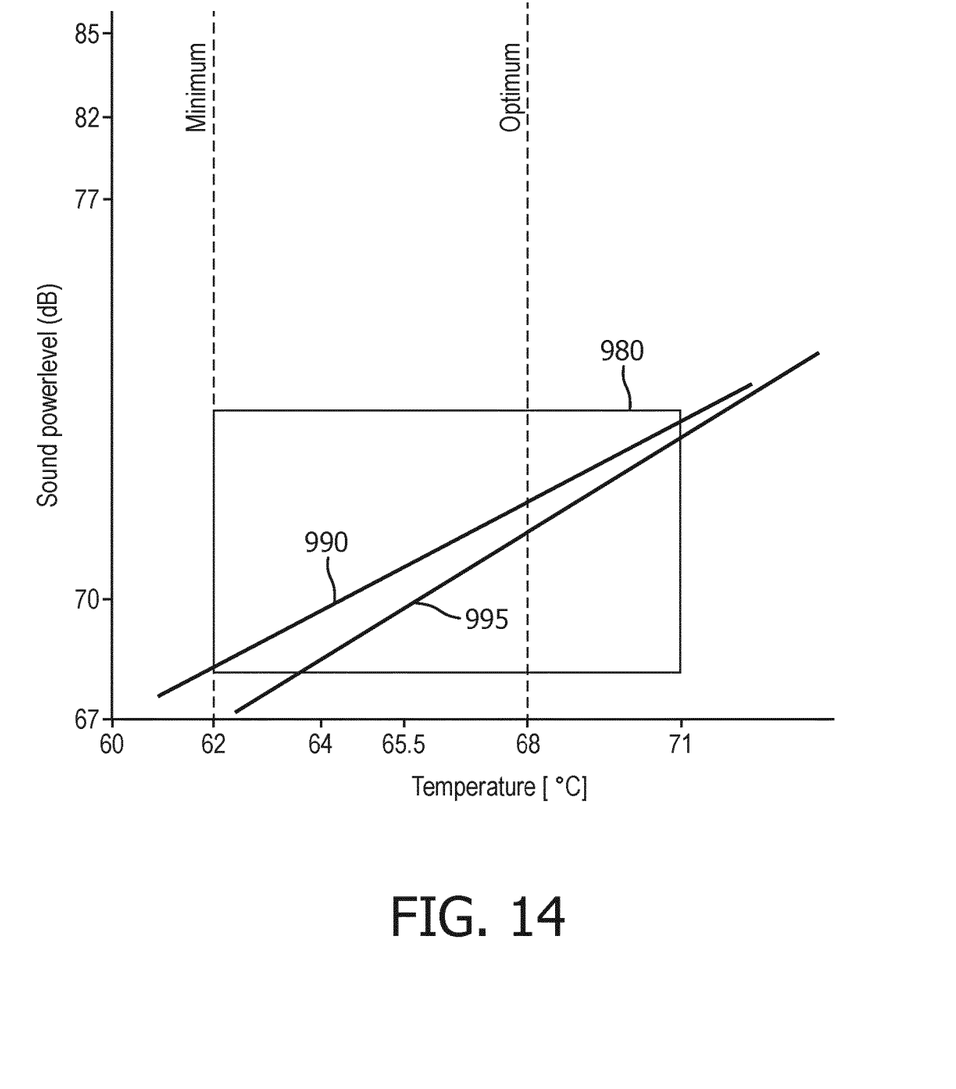
FIG. 14 shows a plot of sound level versus temperature for various designs.

FIG. 14 shows the relation between noise level (y-axis, dB) and beverage temperature (x-axis).

The rectangle 980 presents the working operating window. Point 990 is a 70 dB operating point for the modified device for preparation of a Latte Macchiato and point 995 is a 70 dB operating point for the modified device for preparation of a Cappuccino (typically with a shorter milk preparation cycle than for a Latte Macchiato and hence higher temperature).

The points 990 and 995 each lie on a respective operating line. The parameter that is changed to set the position along the operating line is the restriction 950 in the milk channel, as discussed above. By setting the restriction to give a smaller passageway, less cold milk is dosed to the frothing section. Because the steam flow temperature remains the same, the temperature of the mixture goes up. However, since there will be less of the milk and steam mixture in the frothing section 230, the noise level may go up as well.

Thus, the flow restriction 950 can be tuned (or equivalently the design of the flow channel 210 can be selected) to achieve a desired drink temperature while maintaining low noise levels. The operating points shown correspond to an average Cappuccino temperature of 65.5° C., and Latte Macchiato of 64° C., at 70 dB. A preferred upper specification limit for the average sound level may for instance be around 75 dB. A lower specification limit for the beverage temperature may for instance be around 62° C., and an upper specification limit may for instance be around 71° C. These limits together determine the size of the operating window 980.

Thus, tests show that the desired temperatures can be achieved even with the sound level kept below 75 dB, and even kept to 70 dB.

The examples above all make use of a flow reducing means in the form of a barrier element 900. However, the outflow resistance can be increased in other ways to ensure that a milk mixture collects in the frothing section (the third channel portion 230). One alternative option is to tilt the outlet spout 122 upwards. This, in combination with the ambient pressure, can also be used to increase the outflow resistance such that milk mixture collects in the frothing section. Thus, the flow control to induce sufficient filling of the frothing section with steamed milk may be implemented by means of the configuration and/or orientation of components rather than by the addition of physical blocking elements.

Thus, the invention may be implemented by any deliberate flow control, more particularly, any deliberate flow restriction measure such that the frothing section remains sufficiently full in use that the direct path from the steam inlet to the mixing chamber is interrupted or blocked. The flow reducing means may be an integral part of the design or it may be an added component.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A mixing apparatus, comprising:
a first port for receiving milk;
a second port for receiving steam;
a mixing chamber for mixing the milk, the steam, and air;
an outlet spout which receives the mixed liquid from the mixing chamber, and
a channel arrangement between the first and second ports and the mixing chamber, wherein the channel arrangement comprises:
a first channel portion connected between the first port and a frothing section;
a second channel portion connected between the second port and the frothing section, wherein the frothing section couples to the mixing chamber; and
an air intake channel to the frothing section,
wherein the mixing apparatus comprises a barrier element at an outlet of the mixing chamber to the outlet spout, wherein the barrier element is adapted such that, in use, the frothing section is filled sufficiently with steamed milk that a direct path from the second port to the mixing chamber is interrupted by the steamed milk.

2. The mixing apparatus of claim 1, comprising a flow reducing means downstream of the frothing section, wherein, in use, the flow reducing means enables the frothing section to fill sufficiently with the steamed milk.

3. The mixing apparatus of claim 1, wherein the barrier element comprises a lip formed around an entry to the outlet spout.

4. The mixing apparatus of claim 3, wherein the lip is formed fully around the entry to the outlet spout.

5. The mixing apparatus of claim 1, comprising a flow reducing means downstream of the frothing section, wherein the frothing section comprises a diverging channel having a first channel height at a second port end, and a second channel height at a mixing chamber end, wherein the second channel height is greater than the first channel height, and wherein the flow reducing means comprises the barrier element with a blocking dimension greater than the first channel height and less than the second channel height.

6. The mixing apparatus of claim 1, wherein the barrier element comprises a notch at a lowest point.

7. The mixing apparatus of claim 1, wherein the first channel portion comprises a channel restriction.

8. The mixing apparatus of claim 1, wherein a frothed milk temperature is in the range 62° C. to 71° C. and a sound power level in use is below 75 dB.

9. The mixing apparatus of claim 1, comprising:
a first container, wherein the first container comprises the channel arrangement;
a second container, wherein the second container is adapted to receive the first container; and
a seal disposed between the first container and the second container.

10. The mixing apparatus of claim 9, wherein the first container further comprises a raised container portion, and wherein the channel arrangement is defined between the raised container portion and the seal.

11. The mixing apparatus of claim 9, wherein the seal comprises a span seal.

12. The mixing apparatus of claim 9, wherein the seal comprises a first sealing member and a sealing portion, and wherein the first sealing member comprises a radial seal and the sealing portion comprises a set of span seals.

13. A coffee maker, the coffee maker comprising:
a liquid coffee extraction apparatus;
the mixing apparatus of claim 1; and
a dispenser adapted to dispense:
liquid coffee from the liquid coffee extraction apparatus; and
frothed milk from the mixing apparatus.

14. The mixing apparatus of claim 1, wherein the first channel portion comprises a restriction, and wherein the restriction at least partially blocks the first channel portion.

* * * * *